(12) United States Patent
Plath et al.

(10) Patent No.: US 8,777,809 B2
(45) Date of Patent: Jul. 15, 2014

(54) METHOD FOR OPERATING A TRANSMISSION UNIT OF A VEHICLE DRIVELINE WITH AN ENGINE

(71) Applicant: ZF Friedrichshafen AG, Friedrichshafen (DE)

(72) Inventors: Detlef Plath, Tettnang (DE); Peter Spoerl, Ravensburg (DE); Franz-Josef Schuler, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 74 days.

(21) Appl. No.: 13/737,212

(22) Filed: Jan. 9, 2013

(65) Prior Publication Data
US 2013/0178333 A1 Jul. 11, 2013

(30) Foreign Application Priority Data

Jan. 9, 2012 (DE) .......................... 10 2012 200 172

(51) Int. Cl.
| | |
|---|---|
| *B60W 10/04* | (2006.01) |
| *B60W 10/10* | (2012.01) |
| *B60W 10/18* | (2012.01) |
| *F16H 61/02* | (2006.01) |
| *B60W 10/184* | (2012.01) |
| *B60W 10/11* | (2012.01) |
| *F16H 59/54* | (2006.01) |
| *F16H 59/02* | (2006.01) |
| *F16H 59/44* | (2006.01) |

(52) U.S. Cl.
CPC ................ *B60W 10/11* (2013.01); *F16H 59/54* (2013.01); *F16H 2059/0239* (2013.01); *F16H 61/0213* (2013.01); *B60W 10/184* (2013.01); *F16H 59/44* (2013.01); *B60W 2540/16* (2013.01); *B60W 2540/165* (2013.01); *F16H 2059/0252* (2013.01)
USPC .......................................................... 477/94

(58) Field of Classification Search
CPC ...... B60W 10/04; B60W 10/10; B60W 10/18
USPC ...................................................... 477/94, 96
See application file for complete search history.

(56) References Cited

U.S. PATENT DOCUMENTS 6,370,464 B1    4/2002   Herbster et al.
(Continued)

FOREIGN PATENT DOCUMENTS

| DE | 197 55 076 A1 | 6/1999 |
|---|---|---|
| DE | 101 25 700 A1 | 11/2002 |
| DE | 10 2010 030 495 B3 | 11/2011 |

OTHER PUBLICATIONS

German Search Report Corresponding to DE 10 2012 200 172.7.

*Primary Examiner* — Edwin A Young
(74) *Attorney, Agent, or Firm* — Davis & Bujold, PLLC; Michael J. Bujold (57) ABSTRACT

A method for operating a transmission of a vehicle drivetrain. A transmission ratio can be automatically changed during an operating state depending on a comparison of current operating state parameters with operating parameters stored in a control unit, and can be manually changed depending on a driver's request. Accordingly when the driver requests a change of the transmission ratio, the transmission ratio changes, and a timer starts. If the driver continues the ratio change from an actual transmission ratio value toward a larger or smaller transmission ratio value, the current operating parameters are compared with the stored operating parameters. Upon this comparison, the transmission shifts to higher ratios in comparison to the operating parameters stored in a control device at higher vehicle speeds, and/or a delay between sequential, cyclical transmission ratio changes varies depending on a vehicle deceleration and/or braking pressure in the region of a vehicle brake.

12 Claims, 4 Drawing Sheets

(56) References Cited

U.S. PATENT DOCUMENTS

| | | |
|---|---|---|
| 7,001,308 B2 | 2/2006 | Henneken et al. |
| 2003/0004033 A1* | 1/2003 | Masuda et al. ............... 477/94 |
| 2004/0180753 A1* | 9/2004 | Takamura et al. ............. 477/94 |
| 2008/0242503 A1* | 10/2008 | Eriksson et al. ............... 477/96 |
| 2010/0030421 A1* | 2/2010 | Yoshimura et al. ............ 701/29 |
| 2011/0320094 A1 | 12/2011 | Plath et al. |

* cited by examiner

METHOD FOR OPERATING A TRANSMISSION UNIT OF A VEHICLE DRIVELINE WITH AN ENGINE

This application claims priority from German patent application serial no. 10 2012 200 172.7 filed Jan. 9, 2012.

FIELD OF THE INVENTION

The invention relates to a method for operating a transmission device of a vehicle drivetrain comprising a drive engine.

BACKGROUND OF THE INVENTION

A shifting device for an automatic transmission of a vehicle is known from the document DE 101 25 700 A1 having a pulse counter by means of which the sequential pulses of a manual command by a driver are functionally linked together. A shifting signal can be generated depending on the linkage, whereby a driver's wish can be satisfied even after several downshifts or upshifts. For this purpose, a selector lever can be manually shifted by the driver in the direction of an upshift. When the selector lever reaches a "plus" shifting position, a plus sensor is activated, and a corresponding signal is sent to the pulse counter of an electronic control unit. When the selector lever contrastingly reaches a "minus" shifting position, a minus sensor sends a corresponding signal for a downshift request.

Unfortunately, a driver of a vehicle equipped with a shifting device for setting a desired drive engine speed level is forced, depending on each existing operating state of the vehicle or the vehicle drivetrain thereof, to actuate the selector lever several times sequentially to engage the required transmission ratio in a transmission device of the vehicle drivetrain.

A method for controlling an automatic transmission in which a downshifting function is initiated upon actuating a brake pedal is disclosed in DE 197 55 076 C1. During the method while initiating the function, an electronic transmission control calculates a new downshifting point while the throttle valve is closed by adding a characteristic value to a basic downshifting point. Consequently, when the vehicle brake is actuated, downshifting occurs at vehicle speeds higher than is the case when the vehicle brake is not actuated in order to more strongly exploit the braking effect of a drive engine of a vehicle drivetrain during vehicle deceleration.

Unfortunately, the driver is not supported in the known method when he wants the vehicle drivetrain to change to a desired operating status during manual touch mode by means of which the driver is provided with a greater amount of tractive force.

A method for operating a transmission device with a plurality of transmission ratios is described in the document DE 10 2010 030 495.6 by the applicant. A transmission ratio of the transmission device is automatically selected in automatic shifting mode depending on a current driving state of a vehicle. During a manual shifting mode, a transmission ratio is selected depending on a driver's specified wish. When a driver's shifting request exists, automatic shifting mode changes to manual shifting mode. Each transmission ratio is assigned a transmission-ratio-specific threshold value of the transmission output speed or an equivalent speed value. Given a driver's downshift request, a target transmission ratio to be engaged by the transmission device is determined depending on the current transmission output speed or an equivalent speed value. The transmission ratio selected as a target transmission ratio has a transmission-ratio-specific threshold value that is greater or equal to the current transmission output speed or an equivalent speed value.

When switching from automatic shifting mode to manual shifting mode, due to the proposed procedure in certain circumstances multiple shifting is activated that yields significant spontaneity. Subsequently however in manual shifting mode, only single shifting is activated in each case when a driver's request element is actuated which does not yield spontaneity acceptable to the driver.

In another procedure known from practice by means of which a driver's requested operating state for a vehicle drivetrain can be set with at least approximately acceptable spontaneity, particularly in the region of a transmission device, cyclical additional upshifts or downshifts are requested after the expiration of a delay when a driver continuously actuates a manual request element.

Unfortunately, this procedure is performed independent of the current operating state of the vehicle which is why the desired spontaneity is available during the procedure and not over the entire operating range of a vehicle.

SUMMARY OF THE INVENTION

The problem addressed by this invention is therefore to propose a method for operating a transmission device of a vehicle drivetrain by means of which a driver's request to set a desired operating state of a vehicle drivetrain can be implemented with a spontaneity that is adaptable depending on the operating state with simultaneously high operating comfort.

In the method according to the invention for operating a transmission device of a motor vehicle drivetrain, a transmission ratio in the transmission device can be automatically changed during an operating state characteristic of the vehicle drivetrain depending on a comparison of current operating state parameters of the vehicle drivetrain with operating parameters stored in a control device, and can be manually changed depending on a driver's request.

According to the invention, when there exists a driver's request to change the transmission ratio, the transmission ratio of the transmission device changes, and a timer starts. Upon detecting a continuous driver's request to change the transmission ratio proceeding from an actual transmission ratio value toward a larger or smaller transmission ratio value over a predefined period, the current operating parameters are compared with the additional operating parameters stored in the control device and, depending thereupon, the transmission ratio changes toward a larger transmission ratio value in comparison to the operating parameters stored in a control device at higher vehicle speeds, and/or a delay between sequential, cyclical transmission ratio changes varies depending on a vehicle deceleration and/or a braking pressure in the region of a vehicle brake.

Preferably, additional characteristic maps for downshifts are activated in a procedure according to the invention when a continuous driver's request exists to change the transmission ratio, that is, after the expiration of a deceleration time, for example in the manner known from DE 197 55 076 C2, whereby downshifts are automatically requested and implemented significantly earlier than in known methods.

Each speed level corresponding to the driver's request adjusted by means of the method according to the invention advantageously does not depend on the duration of the driver's request to change the transmission ratio. The speed level is advantageously determined using the procedure according to the invention depending on the driver's actions. A plurality of downshifts in the transmission device are for example also possible in order to adjust to the desired speed level as quickly as possible.

Alternatively or cumulatively, the adaptation of the transmission ratio of the transmission device of the vehicle drivetrain requested by the driver depending on each existing driving situation during a braking process and/or a vehicle deceleration over cyclical downshifts is implemented with greater spontaneity during the method according to the invention such that the delay between two downshifts varies depending on the vehicle deceleration and/or a braking pressure in the region of a vehicle brake.

Because the delay between sequential cyclical transmission ratio changes varies depending on the vehicle deceleration and/or the braking pressure in the region of a vehicle brake, a higher speed level, i.e., with greater spontaneity, can be adjusted in shorter operating times using the procedure according to the invention in comparison to a procedure known in practice in which cyclical transmission ratio changes are triggered upon continuous requests by the driver to change the transmission ratio.

In an advantageous variation of the method according to the invention, the current operating parameters when the vehicle brake is actuated are compared with additional operating parameters stored in the control device and, depending thereupon, the transmission ratio changes toward higher transmission ratio values in comparison to the additional operating parameters stored in the control device at higher vehicle speeds. This further increases the spontaneity of the implementation of the driver's respective request depending on the existing operating state.

If when the vehicle brake is actuated and the vehicle decelerates more than a limit value, the current operating parameters are compared with the additional operating parameters stored in the control device and, depending thereupon, the transmission ratio changes toward greater transmission ratio values in comparison to the additional operating parameters stored in the control device at higher speed, then the respective existing operating state of a vehicle, and a corresponding driver's action as well, are taken into consideration to the extent necessary for a spontaneous reaction when implementing the driver's request.

A driver's request for a transmission ratio change is implemented with the desirable spontaneity in another advantageous variant of the method according to the invention in that an amount of a change in the transmission ratio of the transmission device varies depending on the braking pressure of the vehicle brake and/or the vehicle deceleration, wherein the amount increases as the brake pressure increases and/or as the vehicle deceleration increases.

If the delay between the sequential, cyclical transmission ratio changes in the transmission device decreases with increasing vehicle deceleration and/or increasing braking pressure in the region of the vehicle brake, a driver's request for a transmission ratio change is also implemented with great spontaneity depending on the respective existing operating state.

In another advantageous variant, when a driver's request exists for a transmission ratio change, the transmission ratio of the transmission device is changed and the timer is started, wherein the transmission ratio of the transmission device is adjusted towards higher values upon determining a continuous driver's request to change the transmission ratio starting from an actual transmission ratio value toward a higher transmission ratio value over a predefined period, and upon a driver's actuation of a performance requesting element, by means of which a performance output can be changed of the drive engine of the vehicle drivetrain operatively connected to the transmission device on the transmission input side. Downshifts are implemented in a transmission device depending on the accelerator in response to a continuous driver's request for a transmission ratio change with the simultaneous actuation of a performance request element such as a gas pedal. This makes it possible to easily achieve sufficient vehicle acceleration, for example in an acceleration process when leaving a town, even when the drive engine is in the partial load range, without having to switch back into automatic shifting mode by correspondingly actuating a requesting element.

If the transmission device is designed as a stepped automatic transmission, the transmission ratio is changed in the transmission device over a plurality of transmission ratio steps by means of sequential individual shifts. Only slight differential speeds need to be compensated in each case in the region of the shifting elements of the transmission device participating in the representation of the respective transmission ratio to be disengaged and the shifting elements of the transmission device participating in the respective transmission ratio step to be engaged, and loads in the region of the respective shifting element participating in the transmission ratio change are kept low.

If the transmission device is designed as a stepped automatic transmission, and if the transmission ratio changes in the transmission device are performed over a plurality of transmission ratio steps by means of least one multiple shifting, the driver's requested transmission ratio change can be implemented within short operating times or shifting times with significant spontaneity.

If the transmission ratio changes in the transmission device designed as a stepped automatic transmission are performed over a plurality of transmission ratio steps by means of at least one individual shifting and at least one multiple shifting, a driver's request for a transmission ratio change in the transmission device can be realized with significant spontaneity and simultaneously low loads in the region of the shifting elements participating in the transmission ratio change to be performed.

If the transmission ratio changes toward larger transmission ratio values in the transmission device are prevented when a speed limit value of the drive engine is reached, operating states of the drive engine are easily avoided that for example impair the functioning of the drive engine of the vehicle drivetrain.

If the speed limit value of the drive engine varies depending on the braking pressure of the vehicle brake and/or the vehicle deceleration, spontaneity is possible in implementing a driver's request for a transmission ratio change in the transmission device depending on a respectively existing operating state characteristic of a vehicle drivetrain while simultaneously avoiding impermissibly high loads in the region of the drive engine.

The features indicated in the claims as well as the features indicated in the following exemplary embodiments of the method according to the invention are suitable in each case for further developing the subject matter of the invention by themselves or in any combination with each other. The respective combination of features does not represent a restriction of the further development of the subject matter of the invention and is only essentially representative in nature.

Additional advantages and advantageous embodiments of the method of the invention can be found in subsequent exemplary embodiments, the principle of which is described with reference to the drawing; for the sake of clarity, the same reference signs are used for components with the same design and function in the description of the different embodiments.

BRIEF DESCRIPTION OF THE DRAWINGS

They show.

DETAILED DESCRIPTION OF THE PREFERRED EMBODIMENTS

Figure 1:
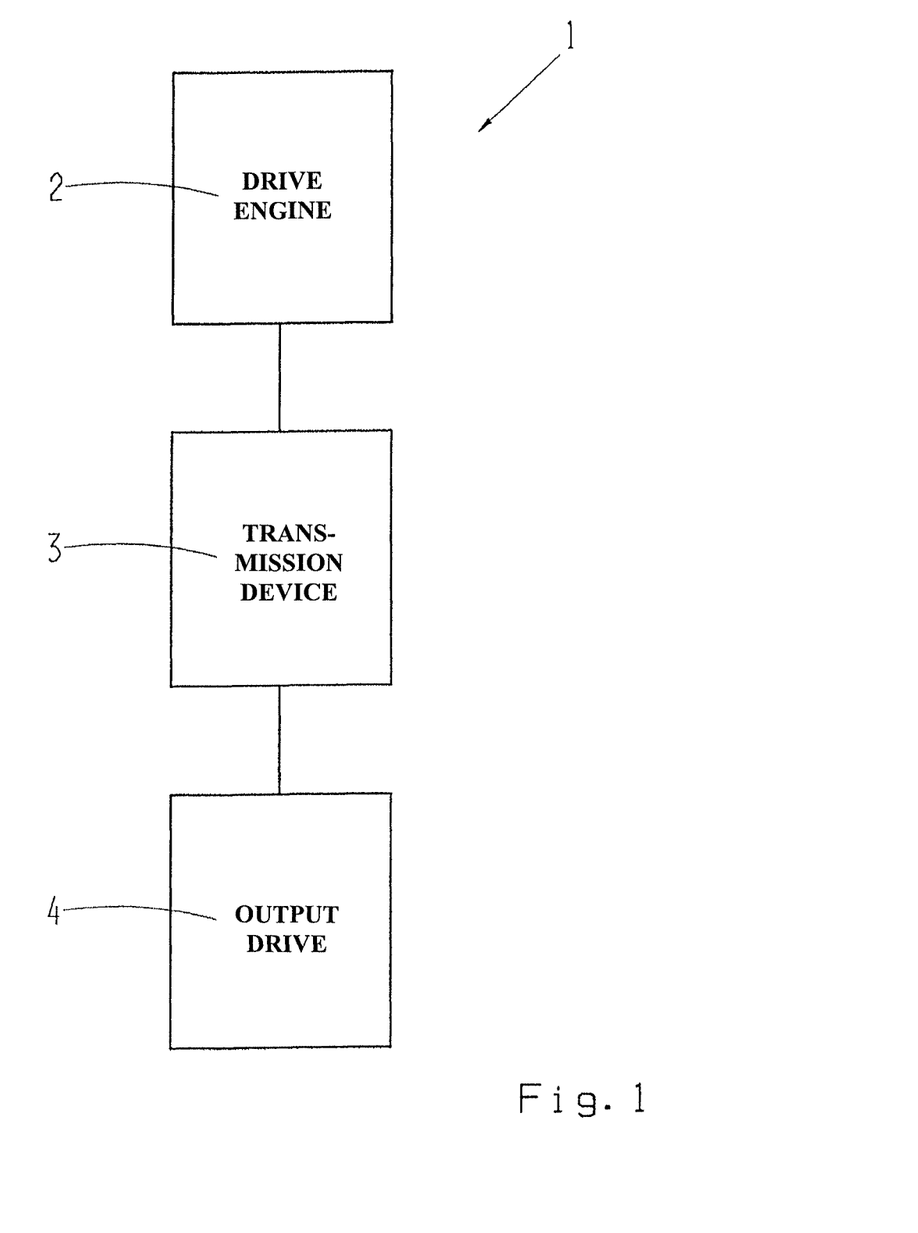
FIG. 1 a simplified representation of a drivetrain of a motor vehicle with a drive engine, a transmission device and an output drive.

FIG. 1 shows a drivetrain 1 of a motor vehicle having a drive engine 2, a transmission device 3, and an output drive 4. Various transmission ratios for forward and reverse travel can be realized with the transmission device 3.

The transmission device 3 can be any automatic transmission known in practice such as a double clutch transmission, a torque converter transmission, an automated manual transmission or a continuously variable transmission in order to realize the required transmission ratio depending on each existing operating state of the drivetrain 1.

The drive engine 2 in the exemplary embodiment of the drivetrain 1 depicted in FIG. 1 is designed as an internal combustion engine and can be designed in an alternative embodiment as an electric motor or hybrid drive.

In the following, the method according to the invention will be further explained with reference to a transmission device 3 designed as a double clutch transmission, wherein nine different transmission ratio steps for forward travel with decreasing transmission ratio values or transmission ratios can be realized by the transmission device 3. The method is equally applicable to continuously variable transmission devices.

The transmission device 3 can be operated both in automatic shifting mode as well as in manual shifting mode or a shifting mode equivalent thereto. During automatic shifting mode, a transmission ratio step is automatically determined by an electronic transmission control on the basis of the current driving state and engaged in the transmission device 3 by means of a hydraulic control unit coupled thereto.

In order to raise the existing transmission ratio engaged in the transmission device 3 during automatic shifting mode within the range of the drive torque of the drive engine 2 present at the output drive 4, for example to perform a spontaneous passing procedure, or an applied thrust torque of the drive engine 2, for example while traveling on a gradient, automatic shifting mode is first switched to manual shifting mode upon a driver's downshift request.

Automatic shifting mode is changed to manual shifting mode when, among other things, the driver moves a shift lever into a position that activates manual shifting mode and then actuates a so-called touch-minus switch within a predetermined short period to request a change proceeding from a currently engaged transition ratio step to a lower transmission ratio step with a higher transmission ratio.

Additionally or alternatively, it is also possible to identify a driver's shift request triggering a switch from automatic shifting mode to manual shifting mode when the driver, for example, actuates a touch-minus switch disposed in an region of a steering wheel, wherein a switch preferably occurs to a short-term manual mode equivalent to manual shifting mode during which the driver can change to a transmission ratio step selected in the previous automatic shifting mode by means of a corresponding shifting request. After expiration of the specified period, there is an automatic switch back to automatic shifting mode from short-term manual mode when there is no further shifting request from the driver.

If the driver actuates the touch-minus switch while automatic shifting mode is active, a single downshift is requested by the electronic transmission control. At the same time, actuating the touch-minus switch causes the change from automatic shifting mode to manual shifting mode, and a timer starts which runs as long as the driver actuates the touch-minus switch.

Figure 2:
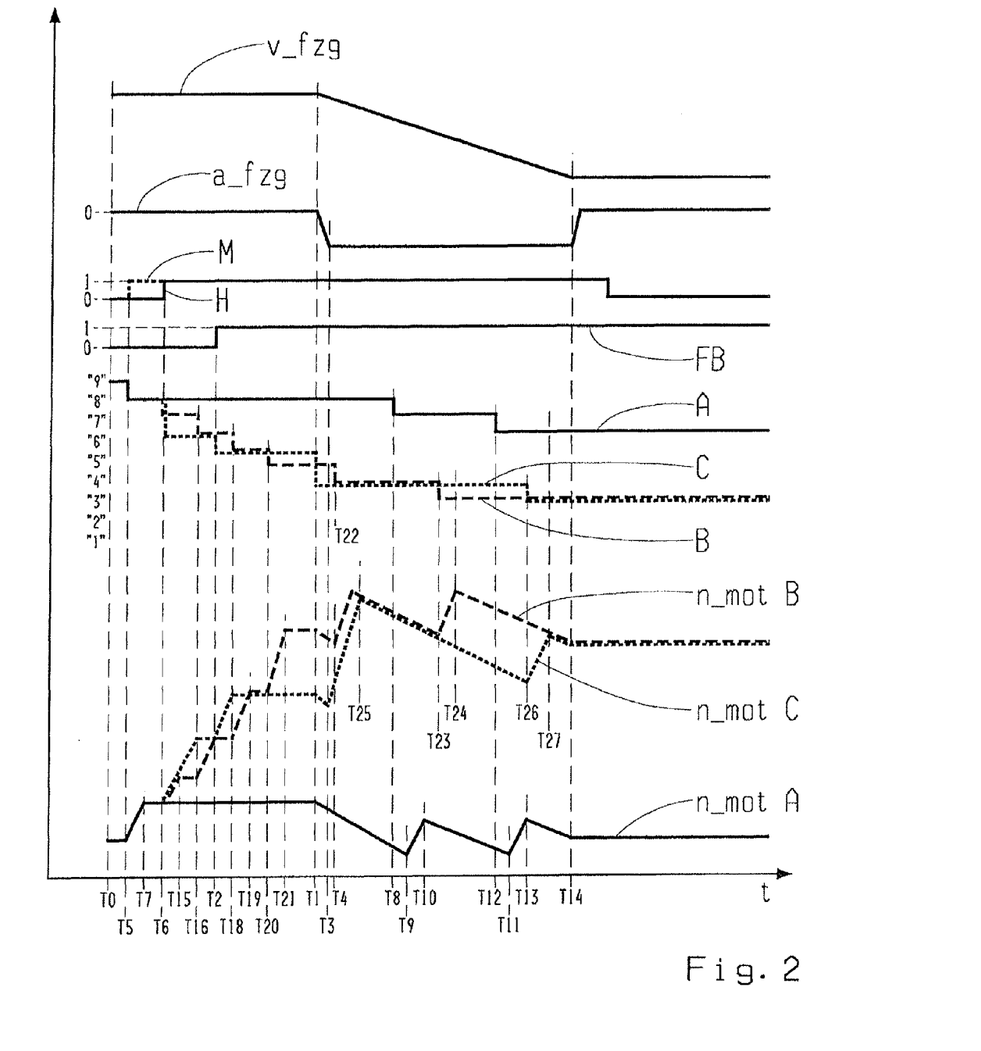
FIG. 2 a plurality of characteristics of different operating state parameters of the drivetrain according to FIG. 1 that occur in each case either when using a known procedure or a first variant of the procedure according to the invention for operating the transmission device of the drivetrain.

FIG. 2 shows several characteristics of different operating state parameters of the drive train 1 according to FIG. 1 over time t that occur during an exemplary operating state characteristic of the drivetrain 1 using two procedures known from practice for actuating the transmission device 3, or using a first variant of the method according to the invention.

At time T0, a ninth transmission ratio "9" is engaged in the transmission device 3 for forward travel, wherein transmission ratio changes are triggered in the transmission device 3 in automatic shifting mode depending on the operating state. A vehicle speed v_fzg is substantially constant between time T0 and time T1. An acceleration a_fzg of the vehicle is at least approximately equal to zero between times T0 and T1.

A status characteristic M indicates whether or not the touch-minus switch is being activated by the driver. When the touch-minus switch is not actuated, the status characteristic M has the value zero, whereas the status characteristic M jumps to the value one when the touch-minus switch is actuated.

Another status characteristic FB indicates whether a vehicle brake is being actuated by the driver. When the vehicle brake is in an actuated operating state, the other status characteristic FB has the value one, and when the vehicle brake is not actuated, it has the value zero. In the present case, the vehicle brake is actuated by the driver at time T2, which is why the status characteristic FB rises from the value zero to the value one.

Due to the vehicle brake being actuated at time T2, the vehicle acceleration a_fzg decreases as of time T1 to a value less than zero, and the vehicle speed v_fzg decreases in the manner shown in FIG. 2 with a constant gradient along a ramp toward a low-speed level. As of time T3, the vehicle acceleration a_fzg remains at a constant value.

At time T5 that quickly follows time T0, the driver actuates the touch-minus switch. Actuating the touch-minus switch triggers a single downshift in the transmission device 3 proceeding from the ninth transmission ratio "9" toward the eighth transmission ratio of "8" for forward travel. This causes a status characteristic A which always has a value equivalent to the transmission ratio "1" to "9" currently engaged in the transmission device 3 to jump.

In the present case, the driver is continuously actuating the touch-minus switch. At time T6 which follows time T5, it is determined that a continuous driver's request exists to change the transmission ratio of the transmission device 3 toward a larger transmission ratio over a predefined period proceeding from the actual transmission ratio value of the eighth transmission ratio "8" for forward travel. This means that at time T6, the driver's holding down the touch-minus switch beyond the predefined duration is recognized and causes a status characteristic H to switch from the value zero to the value one.

The status characteristic A shows the respective transmission ratio engaged in the transmission device 3 that occurs given the characteristic shown in FIG. 2 of the vehicle speed v_fzg and the vehicle acceleration a_fzg when the touch-minus switch is held. Since continuously holding the touch-minus switch is not evaluated beyond the procedure for operating the transmission device 3 on which status characteristic A is based and is known in practice, and since additional downshifts only occur in the transmission device 3 whenever the speed level falls below a predefined engine speed n_mot of the drive engine 2, the status characteristic A at time T5 remains at the value equivalent with the eighth transmission ratio "8".

A characteristic of the engine speed n_motA of the drive engine 2 corresponds to the characteristic of the vehicle speed v_fzg and the characteristic of the vehicle acceleration a_fzg as well as the status characteristic A. At time T0, the characteristic of the motor speed n_motA has a constant speed level. At time T5 of the downshift in the transmission device 3 from the ninth transmission ratio "9" toward the eighth transmission ratio "8", the engine speed n_motA increases to a second speed level until time T7. As of time T7, the engine speed n_motA remains substantially at the second speed level until time T1 and has a constant characteristic. Due to the vehicle deceleration existing from the time T1 and the decreasing vehicle speed v_fzg, the engine speed n_motA also decreases. At time T8, the engine speed n_motA falls below a defined speed level which automatically triggers a downshift in the transmission device 3 proceeding from the eighth transmission ratio "8" toward the seventh transmission ratio "7".

The additional single downshift in the transmission device 3 causes the engine speed n_motA to increase at time T9 in the manner shown in FIG. 2 until time T10 and then fall until time T11. At time T12, the engine speed n_motA again falls below a defined speed level which automatically triggers another single downshift in the transmission device 3 proceeding from the seventh transmission ratio "7" toward the sixth transmission ratio "6". At time T11, the engine speed n_motA again increases due to the last-cited single downshift toward another speed level that is reached at time T13 following time T11. Then the engine speed n_motA decreases due to the vehicle deceleration at time T14, after which the vehicle acceleration a_fzg changes toward zero. Then the engine speed n_motA has a constant speed level which increases depending on the vehicle speed v_fzg and the transmission ratio value of the sixth transmission ratio "6".

The above-described procedure known from practice for operating the transmission device 3 does not provide the driver who is continuously actuating the touch-minus switch the desired thrust torque in the output drive 4 of the drivetrain 1 with the required spontaneity since the engine speed n_motA is relatively low over the entire operating time proceeding from time T0 to time T14.

Another known procedure for operating the transmission device 3 in which continuously actuating the touch-minus switch triggers cyclical single downshifts is graphically illustrated by status characteristic B which always has a value equivalent to the transmission ratio "1" to "9" currently engaged in the transmission device 3. Status characteristic B corresponds to a characteristic of the engine speed n_motB that depends on the characteristic of vehicle speed v_fzg and vehicle acceleration a_fzg, as with the characteristic of the engine speed n_motA. Correspondingly, the ninth transmission ratio "9" for forward travel is engaged in the transmission device 3 at time T0. By actuating the touch-minus switch at time T5, the transmission device 3 again performs a single downshift toward the eighth transmission ratio "8" for forward travel. In contrast to the procedure underlying status characteristic A, the procedure underlying status characteristic B at time T6 at which the predefined period expires and at which a continuous driver's request to change the transmission ratio in the transmission device 3 is recognized, another single downshift toward the seventh transmission ratio "7" is performed. This causes the characteristic of the engine speed n_motB that corresponds to status characteristic B to rise at time T7 until time T15 and then remain at that speed level until time T16. At time T16, another single downshift is triggered in the transmission device 3 due to the continuously actuated touch-minus switch which again causes the engine speed n_motB to increase until time T18. After T18, the engines speed n_motB remains at the speed level reached at time T18 and rises starting at time T19 due to another cyclical downshift in the transmission device 3. At further time T20, another downshift is performed in the transmission device 3 proceeding from the fifth transmission ratio step "5" toward the fourth transmission ratio "4" which again causes the engine speed n_motB to rise to a speed level that is reached at time T21. Then the engine speed n_motB has the speed level at time T21 up to time T1.

Due to the vehicle deceleration starting at time T1, the speed n_motB decreases as of time T1. Since another downshift starting from the fourth transmission ratio "4" toward the third transmission ratio "3" is triggered and performed in the transmission device 3 at further time T22 that briefly follows time T4 because the driver continues to actuate the touch-minus switch, the engine speed n_motB increases to an even higher level. Then, due to the falling vehicle speed v_fzg, the engine speed n_motB decreases up to time T23, as of which another downshift toward the second transmission ratio "2" in the transmission device 3 is triggered due to the driver continuing to actuate the touch-minus switch, and increases the engine speed n_motB until time T24. After time T24, the engine speed n_motB decreases until time T14, at which the vehicle deceleration a_fzg returns toward zero, to a speed level lower than the speed level at time T24, and then remains there.

By means of the last-described procedure, which is also known in practice, for operating the transmission device 3, the driver by continuously activating the touch-minus switch can request a proposed gear that is more appropriate with respect to the procedure described in reference to status characteristic A, and thereby set a higher thrust torque in the region of the output drive 4 with substantially higher spontaneity in regard to the request.

The spontaneity available from the procedure according to status characteristic B can be increased by means of a first variant of the method according to the invention described further below with reference to another status characteristic C with less effort and in a simple manner, whereby a driver can be provided with thrust torque requested in each case in the region of output drive 4 within short operating times. At the same time, it is also possible to provide a correspondingly high level of tractive force by correspondingly actuating a performance requesting element or a gas pedal of a vehicle on the basis of a correspondingly higher speed level of the motor speed n_mot, wherein for example accelerating out of a curve can be performed to the desired extent, and wherein a particularly sporty driving style is in particular possible. This means that an increased thrust effect is achieved by means of suitable downshifts while braking into a curve, and hence also the appropriate speed for accelerating out of the curve is available.

In status characteristic C that, like status characteristic A and status characteristic B in each case has a value equivalent to transmission ratios "1" to "9" currently engaged in the transmission device 3, a single downshift is first performed at time T5 when the touch-minus switch is actuated by the driver proceeding from the ninth transmission ratio "9" toward the eighth transmission ratio "8" in the transmission device 3. This increases a characteristic of the motor speed n_motC corresponding with status characteristic C and the characteristic of the vehicle speed v_fzg as well as the vehicle acceleration a_fzg to the same extent as the characteristic of the engine speeds n_motA and n_motB up to time T7. As of time T7, the characteristic of the engine speed n_motC remains at the speed level of time T7 up to time T6. Since the predefined period expires by time T6, the procedure according to the invention recognizes that the touch-minus switch is being continuously pressed by the driver with the implication that the driver desires another downshift in the transmission device 3.

In automatic shifting mode, shifts are performed in the transmission device 3 depending on a comparison of current operating status parameters of the drivetrain 1 with operating parameters stored in the electronic transmission control that define so-called upshifting and downshifting points. At time T6 when the driver's continued pressing of the touch-minus switch is recognized, the electronic transmission control access additional operating parameters stored in the transmission control or the transmission device 3 control unit, wherein the current operating parameters of the drivetrain 1 are compared with the further operating parameters stored in the control unit upon determining a continuous driver's request for changing the transmission ratio of the transmission device 3 proceeding from an actual transmission ratio value towards a larger transmission ratio value over the predefined period. Depending on the further operating parameters, the transmission ratio is changed toward higher transmission values in comparison to the operating parameters stored in the control unit at higher vehicle speeds, which is why the transmission device 3 downshifts at a earlier time than in automatic shifting mode or when the touch-minus switch is not continuously actuated.

Depending on the respective existing operating point of the drivetrain 1 at time T6, a multiple downshifting to increase spontaneity is also performed in the transmission device 3 instead of a single downshift during which the transmission ratio of the transmission device 3 is changed by more than one step. In the operating characteristic considered in FIG. 2, a multiple downshifting is performed using the procedure underlying status characteristic, characteristic C at time T6 proceeding from the eighth transmission ratio "8" toward the sixth transmission ratio "6", that is, over two transmission ratio steps; consequently, the characteristic of the motor speed n_motC increases to a speed level starting from time T6 up to time T16 that is higher than is the case with the procedure underlying status characteristic B. Subsequently, the engine speed n_motC remains at the speed level of time T16 up to time T18.

Since the driver is actuating the vehicle brake at time T2, the current operating parameters are compared with additional operating parameters stored in the control unit starting at time T2 and, depending thereupon, the transmission ratio changes toward higher transmission ratio values in comparison to the additional operating parameters stored in the control device at higher vehicle speeds. Consequently at time T18 that briefly follows time T2, an additional downshift is performed proceeding from the sixth transmission ratio "6" toward the fifth transmission ratio "5", and hence the level of the engine speed n_motC increases again, and the drive engine 2 has a higher level than with the procedure underlying status characteristic B.

Since the current operating state of the drivetrain 1, or the vehicle designed with the drivetrain 1, is monitored, the existing vehicle deceleration starting at time T1 that due to the actuated vehicle brake and the current vehicle deceleration is greater than a limit value, causes the current operating parameters to be compared with the additional operating parameters stored in the control unit or the electronic transmission controls and, depending thereupon, the transmission ratio of the transmission device 3 changes toward greater transmission values at greater vehicle speeds in comparison to the additional operating parameters stored in a control unit that are used merely when the vehicle brake is actuated without corresponding vehicle deceleration. This procedure causes an additional multiple downshifting at time T1 in the transmission device 3 starting from the fifth transmission ratio "5" toward the third transmission ratio "3", which causes the engine speed n_motC to rise. Starting at time T25, the engine speed n_motC decreases due to the decreasing vehicle speed v_fzg until time T26 at which the engine speed n_motC is at a speed level that triggers another single downshift in the transmission device 3. The additional downshift in the transmission device 3 proceeding from the third transmission ratio "3" toward the second transmission ratio "2" in turn causes the engine speed n_motC to rise up to time T27. After time T27, the engine speed n_motC falls to another speed level and remains at a constant speed level due to the decreasing vehicle deceleration a_fzg at time T14.

In the procedure underlying status characteristic C, downshifts, that is, single or multiple downshifts, occur at higher speeds in comparison in the transmission device 3 in comparison to automatic shifting mode or manual shifting mode when the touch-minus switch is not continuously actuated. Upon recognizing a continuously actuated touch-minus switch after expiration of a deceleration period or of the predefined period, additional characteristic maps are activated for downshifts. Such additional characteristic maps are for example known from DE 197 55 076 C2. With these characteristic maps, automatic downshifts depending on the driver type, actuated vehicle brake and/or standard brake pressure are requested much earlier than usual than in manual shifting mode. At greater vehicle decelerations and/or at a high brake pressure in the region of the vehicle brake, downshifts can be triggered for example at an engine speed of 4,000 RPM (revolutions per minute).

By means of the procedure underlying status characteristic C, a driver can request a proposed gear appropriate to the driving situation with greater spontaneity in comparison to the cyclical downshifts triggered using the procedure underlying status characteristic B since multiple downshifts are triggered in the procedure according to status characteristic C, whereas only cyclical downshifts are performed in the method according to status characteristic B. The spontaneity is therefore improved to the desired extent by means of the procedure according to status characteristic C in comparison to the procedure according to status characteristic B, and in comparison to the procedure according to status characteristic A, in particular when the number of transmission ratios in the transmission device 3 increases.

The procedure according to status characteristic C is for example advantageous in steady travel behind a truck before passing. Without actuating the vehicle brake and without increased actuation of the accelerator, the driver can actuate the touch-minus switch until the desired transmission ratio is engaged in the transmission device 3. The driver thereby retains control of the selection of the transmission ratio, although this occurs with less spontaneity than is the case while simultaneously actuating the vehicle brake and with correspondingly strong vehicle deceleration.

The respective set speed level of the engine speed n_mot does not depend on the period during which the touch-minus switch is continuously actuated by the driver. The respective speed is set depending on the respective driver actions. This means that there is a check of whether or not the vehicle brake is being actuated, and whether there is correspondingly high vehicle deceleration. In addition, the spontaneity of increasing multiple downshifts is possible by means of the procedure according to status characteristic of C to quickly reach the speed level of the engine speed n_mot requested by the driver. After expiration of the predefined period, that is, upon recognizing the continuous holding down or actuation of the touch-minus switch, the downshift speeds are greater in comparison to when the touch-minus switch is not continuously actuated. If it is additionally recognized that the driver is actuating the brake, the downshift speeds are further increased without corresponding vehicle deceleration. If corresponding vehicle deceleration is determined in addition to the continuous pressing of the touch-minus switch and simultaneous actuation of the vehicle brake, the downshifting points are further increased, and spontaneity is additionally improved.

Figure 3:
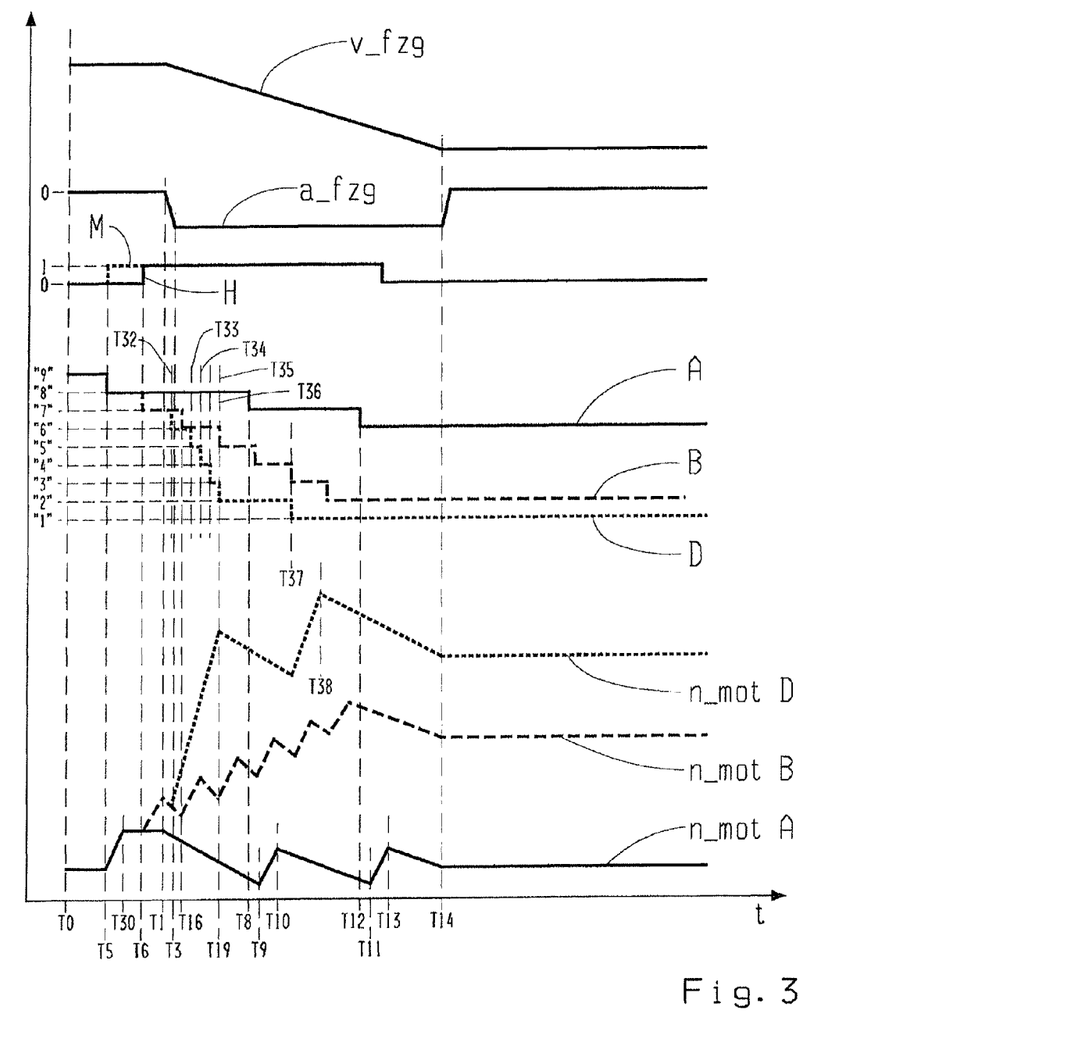
FIG. 3 a representation corresponding to FIG. 2 of various characteristics of operating state parameters of the drivetrain according to FIG. 1 that occur over the operating time when using a known procedure and another variant of the procedure according to the invention.

FIG. 3 shows the characteristic of vehicle speed v_fzg, vehicle acceleration a_fzg, the status characteristic M, status characteristic H, status characteristic A, status characteristic B and the characteristics of engine speeds n_motA and n_motB of the drive engine 2 over time t that substantially correspond to the characteristics according to FIG. 2. In addition, another status characteristic D is shown in FIG. 3 which is based on the second variant of the method according to the invention which is further explained in the following description.

At time T0, the ninth transmission ratio "9" for forward travel is engaged in the transmission device 3 of the drivetrain 1 according to FIG. 1, and transmission ratio changes are automatically set in the transmission device 3 in automatic shifting mode. At time T5, the driver actuates the touch-minus switch which causes the status characteristic M to rise from the value zero to the value one, and a single shift is performed in the transmission device 3 toward the eighth transmission ratio "8", or a single downshift is performed. This causes engine speed n_motA, engine speed n_motB and engine speed n_motD to increase in the manner shown in FIG. 3 from the speed level existing at time T5 to the speed level existing at time T30. At time T31 which is before time T7, there is another cyclical shift or another single downshift toward the seventh transmission ratio "7" when the transmission device 3 is operated using the procedure according to status characteristic B which causes engine speed n_motB to increase starting from the speed level existing at time T30.

Since the vehicle acceleration a_fzg at time T31 is substantially zero and there is therefore substantially no vehicle deceleration, the characteristic of the engine speed n_motD corresponding to status characteristic D substantially corresponds to the characteristic of engine speed n_motB which in turn corresponds to status characteristic B. At time T32, the vehicle deceleration a_fzg exceeds a value of a limit value. While operating the transmission device 3 according to the procedure underlying status characteristic D, another single downshift toward the sixth transmission ratio "6" is triggered in the transmission device 3 if the driver continues to actuate the touch-minus switch, which causes an additional increase in the engine speed n_motD. Since the vehicle deceleration after time T32 remains greater than the limit value value of the vehicle deceleration, and since the driver continues to actuate the touch-minus switch, additional single downshifts occur at times T33, T34, T35, T36 and T37 that each quickly follow each other in the procedure according to status characteristic D in comparison to the method according to status characteristic B, wherein the first transmission ratio "1" for forward travel is engaged in the transmission device 3 by the last single downshift at time T37.

Due to the sequential single downshifts that quickly follow each other at times T32 to T36, the engine speed n_motD is guided to a high-speed level at substantially constant gradient within short operating times in the manner shown in FIG. 3 despite the decreasing vehicle speed v_fzg. The single downshift at time T37 starting from the second transmission ratio "2" toward the first transmission ratio "1" is performed at a greater time interval from T36 since the last single downshift can only occur when the engine speed n_motD falls below a predefined maximum speed level. This prevents an impermissibly high engine speed n_motD in the region of the drive engine 2 that can permanently impair the functioning of the drive engine 2 in certain circumstances or significantly impair driving comfort. At time T38 which follows time T37, the engine speed n_motD reaches its maximum and then due to the further decreasing vehicle speed v_fzg decreases until time T14, at which the vehicle deceleration a_fzg continuously decreases, and then maintains an at least approximately constant speed level.

When a continuously actuated touch-minus switch is recognized in the procedure underlying status characteristic D, the implementation of a transmission ratio requested by the driver is further accelerated in comparison to the procedure according to status characteristic B when the vehicle brake is actuated and/or depending on the respective existing vehicle deceleration in that the time between two downshifts in the transmission device 3 varies depending on the vehicle deceleration and/or the brake pressure. The time period between the two individual downshifts thereby increasingly shrinks as the vehicle deceleration increases and/or as a brake pressure increases.

In addition, a maximum downshift speed or maximum drive engine speed at which a downshift is performed in each case in a transmission device 3 starting from the actual transmission ratio currently engaged in the transmission device 3 can be varied depending on the current vehicle deceleration and/or the braking pressure. The spontaneity is further increased when the maximum downshifting speed is greater as the vehicle deceleration increases and/or the brake pressure increases than is the case when the vehicle deceleration is lower and/or the brake pressure is less. Hence the downshifts in the transmission device 3 are requested at shorter sequential intervals when the vehicle deceleration is greater.

Figure 4:
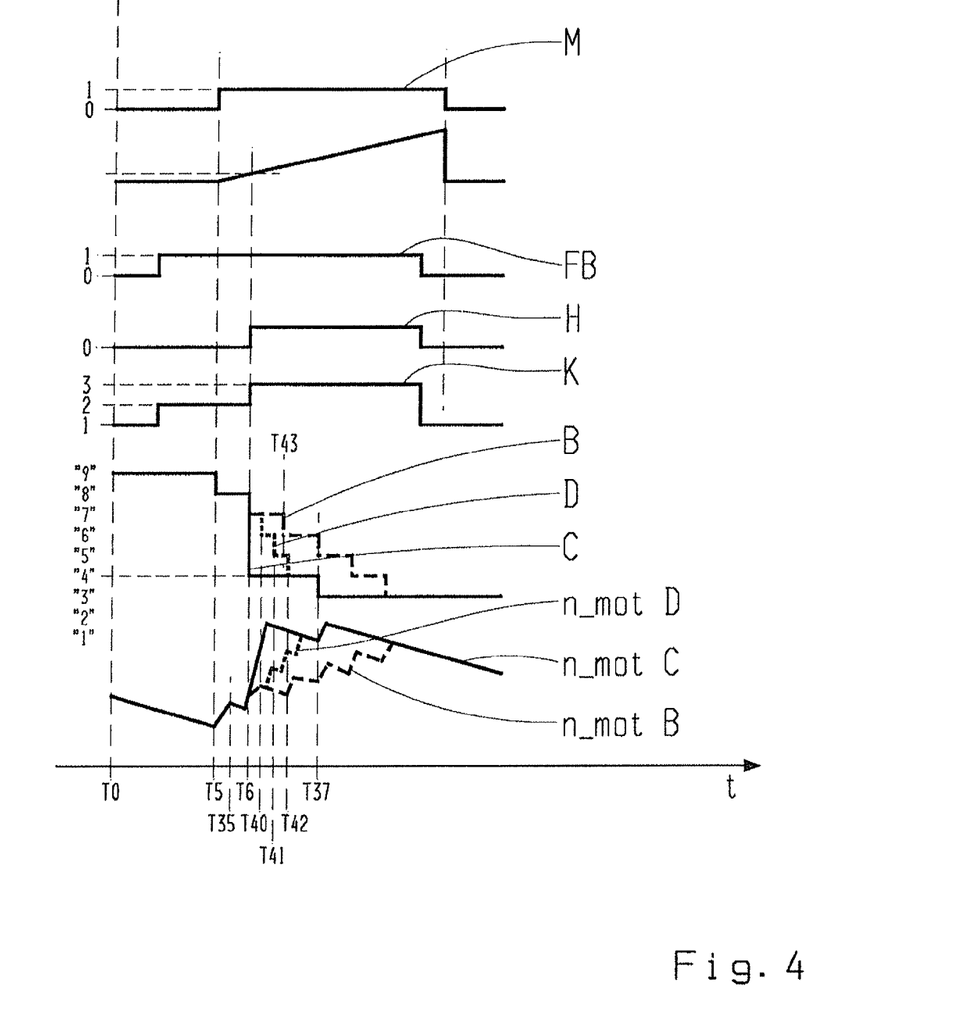
FIG. 4 a representation corresponding to FIG. 2 of different characteristics of operating parameters of the drivetrain according to FIG. 1 that occur when using a known procedure, a variant of the procedure according to the invention based on the representation according to FIG. 2 and the other variation based on the representation of the procedure according to the invention according to FIG. 3.

FIG. 4 shows status characteristic M, status characteristic FB, status characteristic H, status characteristic B, status characteristic C, status characteristic D and the corresponding characteristic of motor speeds n_motB, n_motC and m_motD over time t. In addition, FIG. 4 shows a status characteristic K having the value one when automatic shifting mode is activated. If status characteristic K has the value two, manual shifting mode is activated. Status characteristic K jumps to the value three when continuous holding of the touch-minus switch is recognized and the vehicle brake is also actuated by the driver.

In FIG. 4, a comparison can be made between the procedure known from practice according to status characteristic B and the two variants of the method according to the invention according to status characteristic C and status characteristic D. As described in FIG. 2 and FIG. 3, first a single shift is performed in the transmission device 3 of the drivetrain 1 according to FIG. 1 starting from the ninth transmission ratio "9" toward the eighth transmission ratio "8" by actuating the touch-minus switch at time T5 which causes the engine speeds n_motB, n_motC and n_motD to increase in the manner shown in FIG. 4 until time T35. At time T6 when the driver's continuous actuation of the touch-minus switch is recognized, a multiple downshifting is triggered due to the current operating point of the drivetrain 1 in the procedure according to status characteristic C proceeding from the eighth transmission ratio "8" toward the fourth transmission ratio "4", whereby the engine speed n_motC increases with a significant gradient toward a higher speed level. A driver's downshift request due to continuously actuating the touch-minus switch is therefore implemented with the greatest spontaneity.

However, this spontaneity is achieved by high loads in the region of the shifting elements participating in the transmission ratio change in the transmission device 3 since significantly higher differential speeds need to be compensated in the region thereof than is the case with a single downshift.

If the transmission device 3 is actuated according to the procedure underlying status characteristic D, a single downshift is first performed from the eighth transmission ratio "8" toward the seventh transmission ratio "7" at time T6. This downshift is also triggered by the procedure underlying status characteristic B.

Since the driver actuates the vehicle brake at time T6 and the status characteristic H simultaneously has the value one, another single downshift is triggered in the transmission device 3 toward the sixth transmission ratio "6" at time T40 using the procedure underlying status characteristic D, whereas according to the procedure according to status characteristic B, the single downshift is performed toward the sixth transmission ratio "6" at a significantly later time T43. In comparison to operating the transmission device 3 according to the procedure underlying status characteristic B, the procedure according to status characteristic D offers greater spontaneity in implementing the driver's specified wish. Since the engine speed n_motD does not reach the maximum downshift speed at time T40 due to the single downshift, two additional downshifts are performed in the transmission device 3 at another time T41 briefly following time T40 as well as at another subsequent time T42, whereby the engine speed n_motD increases to a significantly greater extent in comparison to the motor speed n_motB.

In another variant of the method according to the invention, the driver's specified wish to set a specific transmission ratio depending on the respective existing operating state of the drivetrain 1 upon recognition that the touch-minus switch is being held down occurs using the procedure according to status characteristic C, or according to the procedure according to status characteristic D. For this purpose the current operating state of the drivetrain 1 is always monitored. If for example prerequisites exist for changing the transmission ratio according to the procedure underlying status characteristic C, the transmission ratio in the transmission device 3 is changed in the described manner with significant spontaneity. If in contrast prerequisites exist for using the procedure according to status characteristic D, the driver's specified wish is implemented according to the procedure underlying status characteristic D upon recognizing that the touch-minus button is being held down.

The time intervals between cyclical downshifts that are triggered by the procedure according to status characteristic D always relate to the last implemented downshift. The last implemented downshift can either be triggered by the procedure according to status characteristic C, or according to status characteristic D, or by another function.

This gives the driver the ability to distinguish additional cyclical downshifts from other downshifts and, if applicable, to avoid them by releasing the touch-minus button.

Additionally in the procedure according to status characteristic C and the procedure according to status characteristic D, downshifts in the transmission device 3 occur depending on the accelerator when the touch-minus button is held down while the gas pedal is simultaneously actuated. This allows the driver to achieve sufficient acceleration when accelerating out of a town even in the partial load range without switching back to automatic shifting mode with the selector lever.

In general, downshifts in the transmission device 3 are prevented in all the procedures when an applicable maximum engine speed of the drive engine 2 is exceeded.

In comparison to the procedure according to status characteristic D, the procedure according to status characteristic C advantageously offers the possibility of being able to trigger multiple downshifts in the transmission device 3. If the speed level desired by the driver arises in the region of the drive engine 2, the driver can continue to hold down the touch-minus switch without the speed level of the engine speed of the drive engine 2 changing. In comparison, the driver needs to release the touch-minus switch in the procedure according to status characteristic D when the speed level potentially becomes too high in the region of the drive engine 2.

In contrast, the speed level achievable by means of the procedure according to status characteristic C is in certain circumstances significantly lower, especially when the vehicle brake is not actuated and without vehicle deceleration, than the speed level achievable by means of the procedure according to status characteristic D so that the driver is not surprised with undesirable high speeds of the drive engine upon actuating the brake.

Downshifts triggered using the procedure according to status characteristic D do not depend on speed but rather occur in time intervals. The driver thereby receives an immediate reaction to holding down the touch-minus switch and thereby receives control of the number of downshifts in the transmission device 3 and hence also the engaged gear.

REFERENCE CHARACTERS

1 Drivetrain
2 Drive engine
3 Transmission device
4 Output drive
A, B, C, D,
FB, H, K, M Status characteristics
a_fzg Vehicle acceleration
n_mot Engine speed of the drive engine
t Time
T Discrete point in time
v_fzg Vehicle speed
"1" to "9" Transmission ratio for forward travel

The invention claimed is:

1. A method for operating a transmission device (3) of a vehicle drivetrain (1) with a drive engine (2), a transmission ratio in the transmission device (3) being automatically changeable during an operating state characteristic of the vehicle drivetrain (1) depending on a comparison of current operating state parameters of the vehicle drivetrain (1) with additional operating parameters stored in a control unit, and being manually changeable depending on a driver's request, the method comprising the steps of:

changing the transmission ratio of the transmission device (3) and starting a timer when a driver's request to change the transmission ratio is detected;

upon determining a continuous driver's request to change the transmission ratio proceeding from an actual transmission ratio value toward either a larger or smaller transmission ratio value over a predefined period, performing the comparison of the current operating parameters with the additional operating parameters stored in the control unit; and depending upon the comparison, at least one of changing the transmission ratio toward a larger transmission ratio value in comparison to the additional operating parameters stored in a control device at higher vehicle speeds, and variably delaying sequential, cyclical transmission ratio changes depending on at least one of vehicle deceleration and a braking pressure in a region of a vehicle brake.

2. The method according to claim 1, further comprising the step of comparing the current operating parameters when the vehicle brake is actuated with the additional operating parameters stored in the control device and, depending thereupon, the transmission ratio changes toward higher transmission ratio values in comparison to the additional operating parameters stored in the control device at higher vehicle speeds.

3. The method according to claim 1, further comprising the step of comparing the current operating parameters with the additional operating parameters stored in the control device, when the vehicle brake is actuated and the vehicle deceleration is greater than a limit value and, depending thereupon, the transmission ratio changes toward greater transmission ratio values in comparison to the additional operating parameters stored in the control unit at higher speeds.

4. The method according to claim 1, further comprising the step of varying a value of a change of the transmission ratio of the transmission device (3) depending on at least one of the brake pressure of the vehicle brake and the vehicle deceleration, wherein the value increases as at least one of the brake pressure increases and the vehicle deceleration increases.

5. The method according to claim 1, further comprising the step of decreasing the time interval between the sequential, cyclical transmission ratio changes in the transmission device (3) as at least one of the vehicle deceleration increases and the brake pressure increases in the region of the vehicle brake.

6. The method according to claim 1, further comprising the steps of changing the transmission ratio of the transmission device (3) and starting the timer when the driver's request for the transmission ratio change is determined, adjusting the transmission ratio of the transmission device (3) towards higher values upon determining the continuous driver's request to change the transmission ratio starting from an actual transmission ratio value toward a higher transmission ratio value over a predefined period, and upon a driver's actuation of a performance requesting element, by which a performance output can be changed of the drive engine (2) of the vehicle drivetrain (1) operatively connected to the transmission device (3) on a transmission input side.

7. The method according to claim 1, further comprising the step of changing the transmission ratio of a stepped automatic transmission over a plurality of transmission ratio steps by sequential individual shifts.

8. The method according to claim 1, further comprising the step of changing the transmission ratio of a stepped automatic transmission over a plurality of transmission ratio steps by at least one multiple shifting.

9. The method according to claim 1, further comprising the step of changing the transmission ratio of a stepped automatic transmission over a plurality of transmission ratio steps by at least one single shifting and at least one multiple shifting.

10. The method according to claim 1, further comprising the step of preventing transmission ratio changes toward larger transmission ratio values in the transmission device (3) when a limit value of the speed of the drive engine (2) is reached.

11. The method according to claim 10, further comprising the step of varying the limit value of the speed of the drive engine (2) depending on the at least one of the brake pressure of the vehicle brake and the vehicle deceleration.

12. A method of operating a transmission device (3) of a vehicle drivetrain (1) having a drive engine (2), the method comprising the steps of:

initiating a change of transmission ratios of the transmission device (3) and starting a timer when a driver requests the change of the transmission ratios of the transmission device (3);

comparing current operating parameters of the drivetrain with stored operating parameters that are stored in a control unit when the driver continues the request to change the transmission ratio from an actual transmission ratio value toward either a larger or a smaller transmission ratio value over a predefined period of time;

depending on the comparison, at least one of changing the transmission ratio toward a larger transmission ratio value in comparison to the operating parameters stored in the control device at higher vehicle speeds, and variably delaying sequential, cyclical transmission ratio changes depending on at least one of vehicle deceleration and a braking pressure of a vehicle brake.

* * * * *